US008783796B2

(12) United States Patent
Thorson

(10) Patent No.: US 8,783,796 B2
(45) Date of Patent: Jul. 22, 2014

(54) PIN FOR USE IN TRACK ROLLERS AND BOGIE ASSEMBLIES

(75) Inventor: Timothy A Thorson, Morton, IL (US)

(73) Assignee: Caterpillar Inc., Peoria, IL (US)

(*) Notice: Subject to any disclaimer, the term of this patent is extended or adjusted under 35 U.S.C. 154(b) by 496 days.

(21) Appl. No.: 13/163,186

(22) Filed: Jun. 17, 2011

(65) Prior Publication Data

US 2011/0309672 A1 Dec. 22, 2011

Related U.S. Application Data

(60) Provisional application No. 61/356,530, filed on Jun. 18, 2010, provisional application No. 61/357,877, filed on Jun. 23, 2010.

(51) Int. Cl.
*B62D 55/15* (2006.01)

(52) U.S. Cl.
USPC .......................................................... 305/138

(58) Field of Classification Search
USPC ......... 305/117, 118, 119, 124, 125, 128, 129, 305/130, 133, 135, 136, 138, 142
See application file for complete search history.

(56) References Cited

U.S. PATENT DOCUMENTS

| 2,368,611 | A | * | 1/1945 | Charnock | 403/326 |
|---|---|---|---|---|---|
| 2,403,397 | A | * | 7/1946 | Rankin | 384/459 |
| 2,712,478 | A | | 7/1955 | Craig | |
| 2,914,207 | A | * | 11/1959 | Moore | 215/270 |
| 2,915,346 | A | | 12/1959 | Stallman | |
| 3,679,216 | A | | 7/1972 | Dadds et al. | |
| 3,773,393 | A | * | 11/1973 | Story et al. | 305/119 |
| 4,042,065 | A | * | 8/1977 | Crum | 184/109 |
| 4,152,031 | A | | 5/1979 | Maguire | |
| 4,582,367 | A | | 4/1986 | Jacquet et al. | |
| 4,702,488 | A | | 10/1987 | Baillie | |
| 4,834,478 | A | * | 5/1989 | Stevens et al. | 305/124 |
| 5,044,812 | A | | 9/1991 | Ardelt et al. | |
| 8,025,346 | B2 | * | 9/2011 | Livesay | 305/106 |

* cited by examiner

*Primary Examiner* — S. Joseph Morano
*Assistant Examiner* — Jean Charleston
(74) *Attorney, Agent, or Firm* — Miller, Matthias & Hull

(57) ABSTRACT

A pin for use in a track roller or bogie assembly comprises an outboard facing end, an inboard facing end having an aperture, a cylindrically-shaped external surface extending from the outboard facing end to the inboard facing end, and an inner surface extending inwardly from the aperture of the inboard facing end toward the outboard facing end and defining a cavity within the pin. The inner surface of the pin includes a groove disposed proximate the inboard facing end into which an outer surface of a resilient stopper expands to increase the pressure resistance of the pin and stopper to stopper being pushed or pulled from the pin.

12 Claims, 6 Drawing Sheets

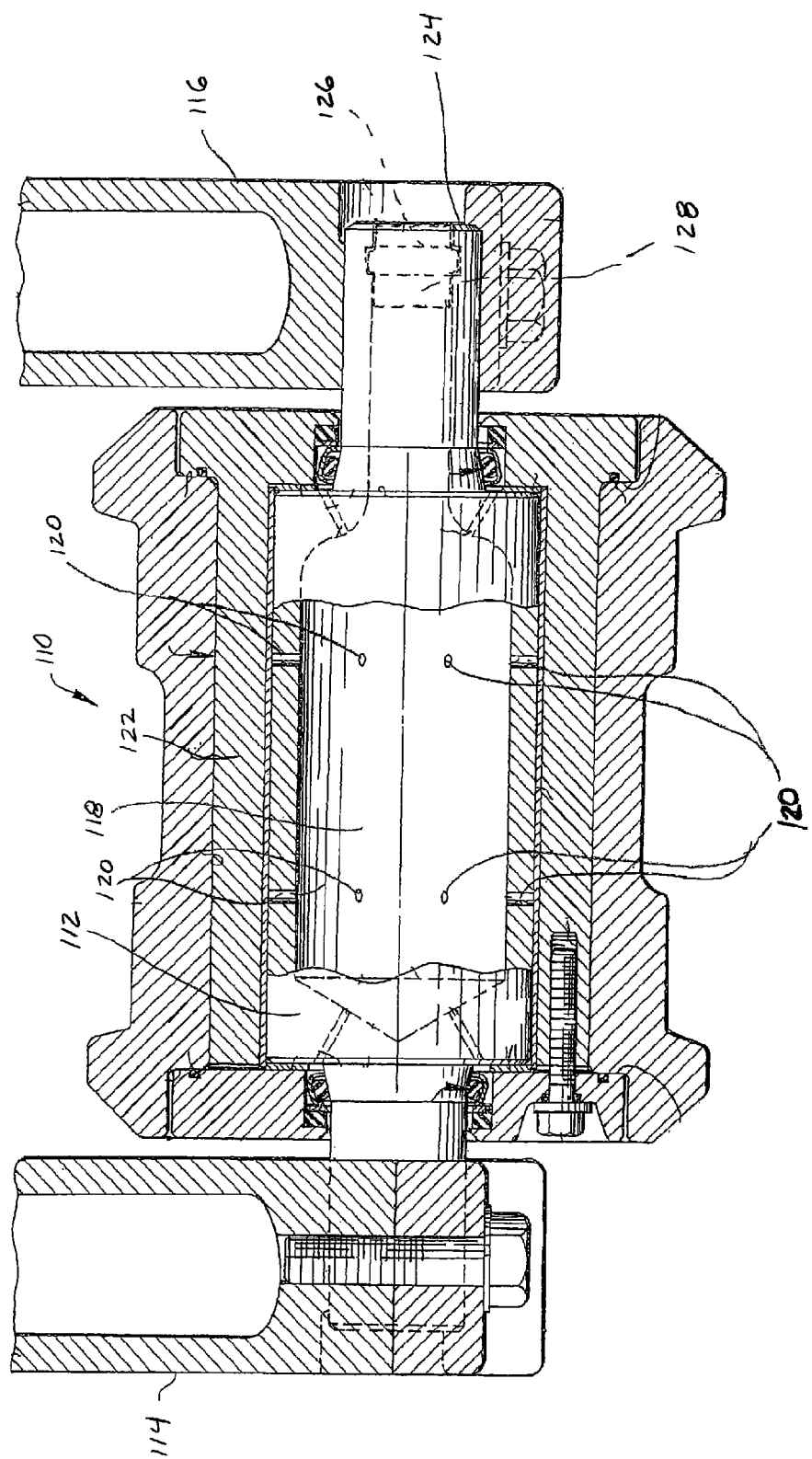

PIN FOR USE IN TRACK ROLLERS AND BOGIE ASSEMBLIES

CROSS-REFERENCE TO RELATED APPLICATIONS

This is a non-provisional U.S. patent application, which claims priority under 35 U.S.C. §119(e) to U.S. Provisional Patent Application Ser. No. 61/356,530 filed on Jun. 18, 2010, and to U.S. Provisional Patent Application Ser. No. 61/357,877 filed on Jun. 23, 2010, the entireties of which are incorporated by reference herein.

TECHNICAL FIELD

This invention relates to improved track rollers and bogie assemblies for track-type tractors and, more particularly, to a pin for a bogie or track roller that provides greater retention of a stopper disposed therein to retain a lubricating fluid.

BACKGROUND

Some tracked vehicles, such as bulldozers and tanks, have devices known as bogies as external suspension components. A bogie is a chassis or framework carrying wheels that is attached to a vehicle. The bogie can be fixed in place with respect to the vehicle with the wheels being mounted on a pivoting arm, as on a cargo truck, mounted on a swivel, as on a railway carriage or locomotive, or sprung as in the suspension of a caterpillar tracked vehicle. The bogie has two or more rollers or wheels and some type of sprung suspension to smooth the ride across rough terrain.

One example of bogies for a track-type tractor is shown in U.S. Pat. No. 4,152,031, issued May 1, 1979 to Maguire, is an example of a rotatable shaft and roller assembly. In the Maguire patent, each bogie has a pair of rollers connected to each other by an arm, and the arm in turn is pivotally connected to the bogie frame by a shaft or pin. As the tractor moves over the surface and encounters a bump or other obstruction over which the tracks must pass, the forward roller first engages the obstruction and moves upwardly. The shaft of the bogie moves upwardly by a lesser distance such that the upward shock to the tractor transmitted by the bogie is less if the front roller were attached to a fixed axle. Eventually, the shaft moves upwardly to the full distance needed to pass over the obstacle after the rearward roller is engaged by the obstacle.

The Maguire patent provides an illustration of a shaft assembly for the rollers of the bogie that may similarly be implemented as the shaft or pin about which the arm pivots. A shaft mounted to the bogie frame includes an opening leading to an internal cavity of the shaft. Sleeve bearings are disposed about the outer surface of the shaft, and the roller is mounted about the sleeve bearings and held in place by lateral retaining rings. The shaft includes a pair of bores extending radially from the inner surface defining the cavity to the outer surface of the shaft. A lubricating fluid is added to the cavity through the opening of the shaft, with a resilient plug being inserted into the opening to retain the fluid therein. As the roller and sleeve bearings rotate together about the shaft, the fluid circulates between the cavity and the outer surface of the shaft through the bores to keep the interface between the shaft and the sleeve bearding lubricated.

In arrangements such as that shown in the Maguire patent, the lubricating fluid is critical for the bogie to operate for the duration of the designed useful life. In some implementations, however, the resilient plug can pop out of the opening, thereby allowing the lubricating fluid to drain and causing the bogie to rapidly fail due to the increased friction between the moving parts. The resilient plugs may be pushed out of the opening due to internal pressure within the cavity, or may be dislodged by debris external to the shaft. In many implementations, space limitations may preclude merely placing a cover over the end of the shaft that will retain the plug within the opening. Therefore, a need exists for a new technology for retention of a plug for a shaft in a bogie arrangement that may allow pressure to build within a cavity of the shaft without the plug being forced out to release the lubricating fluid within the cavity.

SUMMARY OF THE DISCLOSURE

According to certain aspects of this disclosure, a pin for use in a track roller or bogie assembly is provided having an outboard facing end, an inboard facing end having an aperture, a cylindrically-shaped external surface extending from the outboard facing end to the inboard facing end, and an inner surface extending inwardly from the aperture of the inboard facing end toward the outboard facing end and defining a cavity within the pin, with the inner surface including a groove disposed proximate the inboard facing end, and the groove having a distance from a longitudinal axis of the pin that is greater than a distance from the longitudinal axis to the portions of the inner surface that do not include the groove.

In another aspect of the disclosure that may be combined with any of these aspects, the inner surface has a cylindrical shape having a uniform diameter, and the groove is an annular groove extending around the entire circumference of the inner surface.

In another aspect of the disclosure that may be combined with any of these aspects, the groove includes a positively oriented face.

In another aspect of the disclosure that may be combined with any of these aspects, the positively oriented face comprises a protrusion extending radially within the groove and having an outboard side surface facing the outboard facing end and extending perpendicular to a longitudinal axis of the pin.

In another aspect of the disclosure that may be combined with any of these aspects, the positively oriented face comprises a protrusion extending radially within the groove and having an outboard side surface facing the outboard facing end and extending at an angle ranging from 90° to 45° from a longitudinal axis of the pin and sloping toward the outboard facing end.

In another aspect of the disclosure that may be combined with any of these aspects, the protrusion has an inboard side surface facing the inboard facing end and extending at an angle ranging from 90° to 45° from the longitudinal axis of the pin and sloping toward the inboard facing end.

In another aspect of the disclosure that may be combined with any of these aspects, the pin includes at least one orifice extending from the inner surface to the external surface, with the orifice placing the cavity in fluid communication with the exterior of the pin.

In another aspect of the disclosure that may be combined with any of these aspects, a cartridge pin assembly for use in a track roller of bogie assembly includes a cartridge pin and an inboard stopper. The cartridge pin includes an outboard facing end, an inboard facing end having an aperture, a cylindrically-shaped external surface extending from the outboard facing end to the inboard facing end, and an inner surface extending inwardly from the aperture of the inboard facing end toward the outboard facing end and defining a cavity within the pin, with the inner surface including a groove disposed proximate the inboard facing end and having a distance from a longitudinal axis of the pin that is greater than a distance from the longitudinal axis to the portions of the inner surface that do not include the groove. The inboard stopper is inserted into the inner surface through the aperture of the inboard facing end and engaging the inner surface to form a substantially water-tight seal at the inboard facing end of the cavity, with a portion of the inboard stopper being disposed within the groove.

In another aspect of the disclosure that may be combined with any of these aspects, the cartridge pin assembly further includes an outboard collar having an axial aperture, with the end of the pin proximate the outboard facing end being inserted into the aperture of the outboard collar and connected thereto, an inboard collar having an axial aperture, with the end of the pin proximate the inboard facing end being inserted into the aperture of the inboard collar and connected thereto, and a hollow cylindrical bushing disposed about the external surface of the pin between the outboard and inboard collars.

In another aspect of the disclosure that may be combined with any of these aspects, the pin of the cartridge pin assembly includes at least one orifice extending from the inner surface to the external surface, with the orifice placing the cavity in fluid communication with the exterior of the pin. The cartridge pin assembly further includes a lubricating fluid disposed within the cavity of the pin, with the orifice being dimensioned to allow the lubricating fluid to flow from the cavity to an outer reservoir defined by the external surface of the pin and an inner surface of the bushing.

In another aspect of the disclosure that may be combined with any of these aspects, a bogie assembly includes the cartridge pin assembly including an outboard facing end, an inboard facing end having an aperture, a cylindrically-shaped external surface extending from the outboard facing end to the inboard facing end, and an inner surface extending inwardly from the aperture of the inboard facing end toward the outboard facing end and defining a cavity within the pin, with the inner surface including a groove disposed proximate the inboard facing end and having a distance from a longitudinal axis of the pin that is greater than a distance from the longitudinal axis to the portions of the inner surface that do not include the groove. The bogie assembly also includes an inboard stopper inserted into the inner surface through the aperture of the inboard facing end and engaging the inner surface to form a substantially water-tight seal at the inboard facing end of the cavity, with a portion of the inboard stopper being disposed within the groove. Still further, the bogie assembly includes an outboard collar having an axial aperture, with the end of the pin proximate the outboard facing end being inserted into the aperture of the outboard collar and connected thereto, an inboard collar having an axial aperture, with the end of the pin proximate the inboard facing end being inserted into the aperture of the inboard collar and connected thereto, and a hollow cylindrical bushing disposed about the external surface of the pin between the outboard and inboard collars. The bogie assembly further includes an outboard frame wall having an aperture, with the outboard collar being inserted into the aperture of the outboard frame wall and connected thereto, an inboard frame wall having an aperture, with the inboard collar being inserted into the aperture of the inboard frame wall and connected thereto, and a bogie arm having an opening there through, with the bogie arm being disposed about and connected to the bushing between the outboard and inboard frame walls with the bushing and the bogie arm being rotatable about the pin.

In another aspect of the disclosure that may be combined with any of these aspects, the outboard facing end of the pin has an aperture and the inner surface of the pin extends to the aperture of the outboard facing end. The bogie assembly further includes an outboard stopper inserted into the inner surface through the aperture of the outboard facing end and engaging the inner surface to form a substantially water-tight seal at the outboard facing end of the cavity, and a cover plate connected to the outboard frame wall and engaging the outboard stopper to retain the outboard stopper within the aperture of the outboard facing end.

Additional aspects of the invention are defined by the claims of this patent.

BRIEF DESCRIPTION OF THE DRAWINGS

FIG. 7 is a cross-sectional view of a track roller implementing a pin or shaft in accordance with the present disclosure.

DETAILED DESCRIPTION

Figure 1:
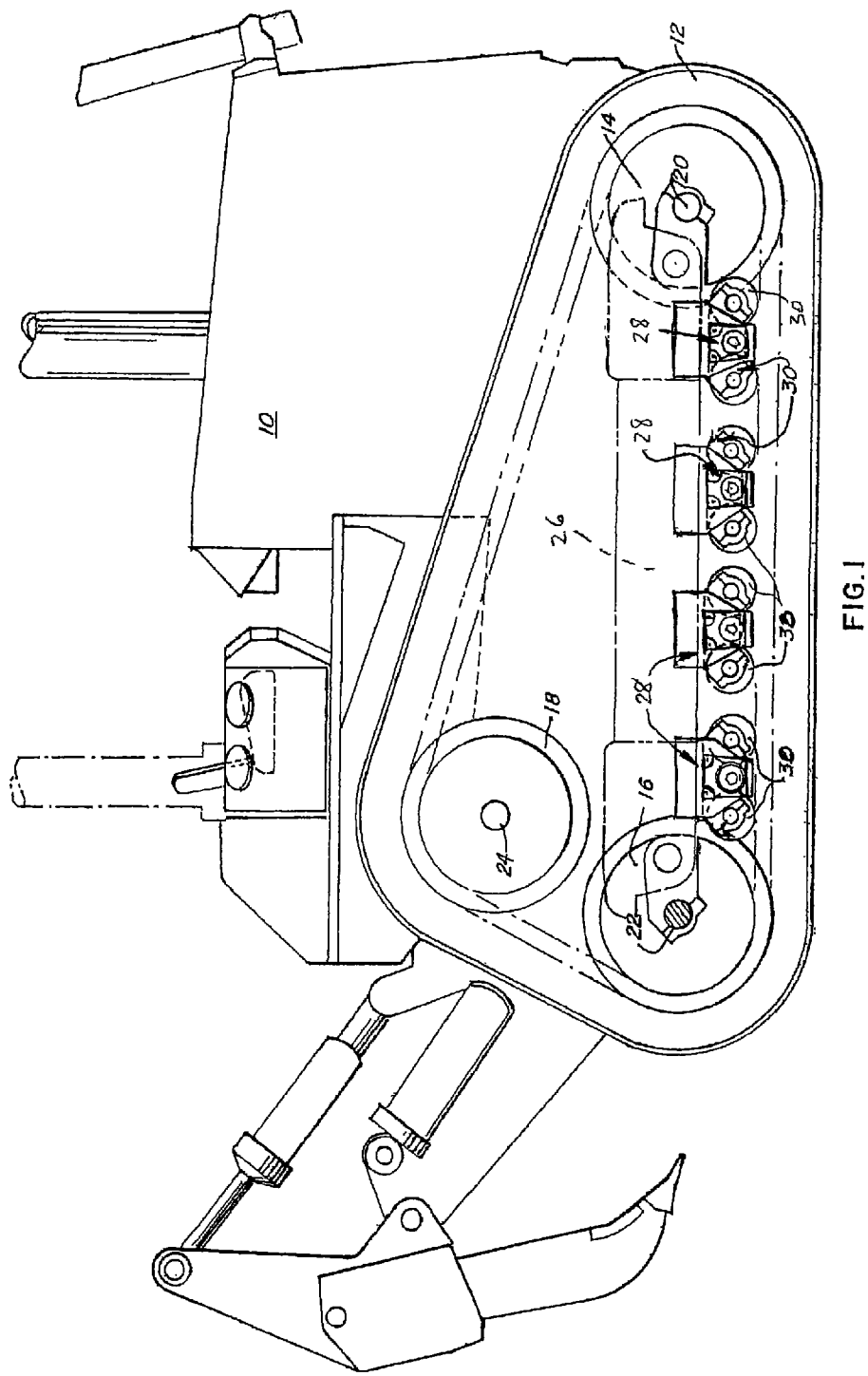
FIG. 1 is a side elevation of an exemplary track-type machine having bogie suspensions.

Referring to FIG. 1, track-type machine 10 is shown having bogie assemblies integrated as part of the undercarriage for the machine 10. The machine 10 has a pair of endless tracks, as track 12, parallel to each other for providing controlled movement of machine 10 in the manner known to those skilled in the art. The track traverses idler assemblies 14 and 16 and drive assembly 18, which are rotatably mounted on shafts 20, 22 and 24, respectively.

Shafts 20, 22 are secured to a main beam 26 of the undercarriage of the machine 10, and a plurality of bogie assemblies 28 located between idler assembly 14 and idler assembly 16 are also secured to the main beam 26. Each bogie assembly 28 has two track rollers 30. The bogie assemblies 28 guide the track 12 while the track 12 is in its ground-engaging position. The track-type machine 10 shown in FIG. 1 may be one of the larger machines manufactured by Caterpillar Tractor Co., the assignee of the present invention. Although the improved assemblies are particularly useful with the larger track-type equipment, it is not limited thereto. In fact, the bogie assemblies 28 of the present disclosure would be advantageous to all types of track-type vehicles.

Figure 2:
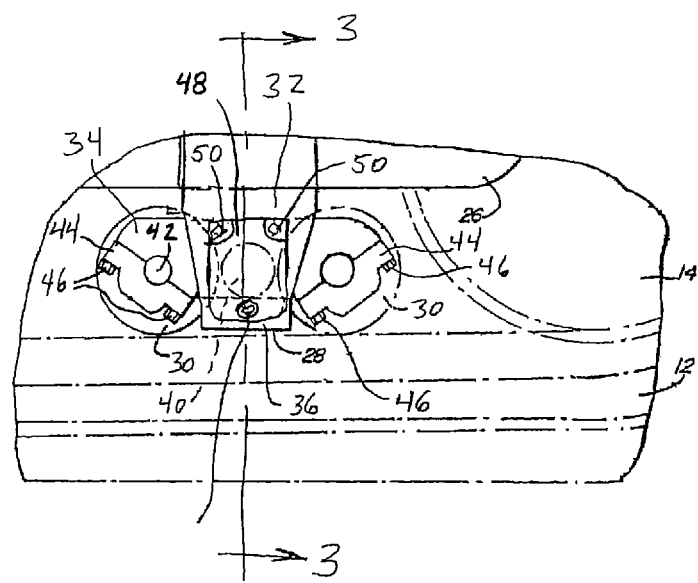
FIG. 2 is a detailed view of a bogie assembly of the machine of FIG. 1.

FIG. 2 shows the detail of the track 12, idler assembly 14, main beam 26 and bogie assembly 28. The bogie assembly 28 includes a bogie frame 32 extending downwardly and having a bogie arm 34 pivotally mounted between an outboard frame wall 36 and inboard frame wall 38 (FIG. 3) by a cartridge pin assembly 40. The rollers 30 are attached at either end of the bogie arm 34, with a shaft 42 being clamped in place by a bearing block 44 and fasteners 46. The cartridge pin assembly 40 is secured from slippage in the outboard direction by a cover plate 48 connected to the outboard frame wall 36 by fasteners 50 and overlying the cartridge pin assembly 40.

Figure 3:
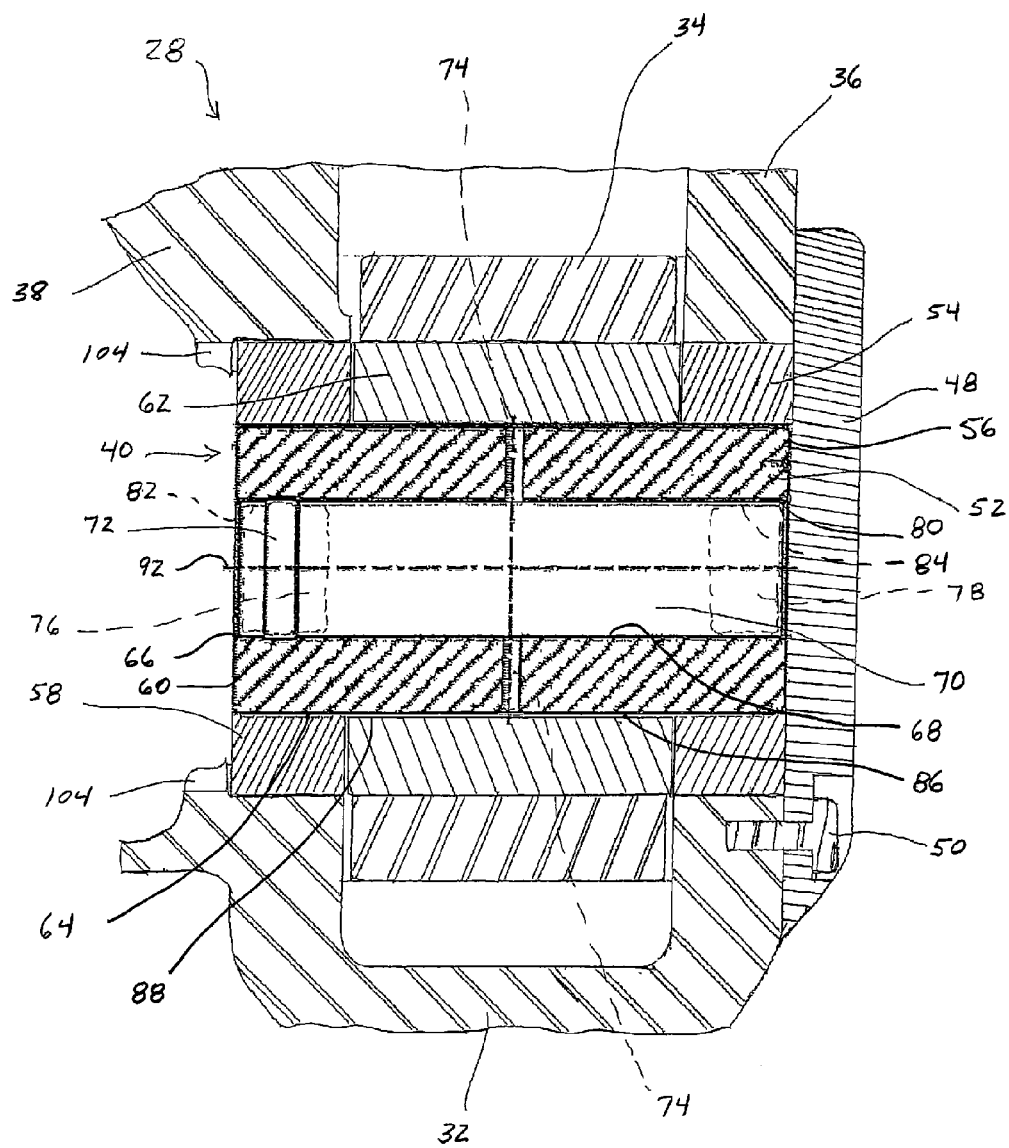
FIG. 3 is a cross-sectional view of the bogie assembly taken through line 3-3 in FIG. 2.

Turning to FIG. 3, which shows a partial cross-section of the bogie assembly 28, the bogie arm 34 is disposed between the bogie frame walls 36, 38 and mounted on the cartridge pin assembly 40. The cartridge pin assembly 40 includes a cylindrical pin 52, an outboard collar 54 disposed on a circular outboard facing end 56 of the pin 52, an inboard collar 58 disposed on a circular inboard facing end 60 of the pin 52, and a bushing 62 disposed about the pin 52 between the collars 54, 58. The pin 52 has a cylindrically-shaped external surface 64 extending from the outboard facing end 56 to the inboard facing end 60. At least the inboard facing end 60 has an aperture 66, with an inner surface 68 of the pin 52 extending inwardly from the inboard facing end 60 toward the outboard facing end 56 and defining a cavity 70 within the pin 52. The inner surface of the pin 52 includes an annular groove 72 disposed proximate the inboard facing end 60. The inner surface 68 of the pin 52 may be generally cylindrical, and the annular groove 72 may extend around the entire circumference of the inner surface 68. The pin 52 may further include at least one lubrication orifice 74 extending from the inner surface 68 to the external surface 64 to place the cavity 70 in fluid communication with the exterior of the pin 52.

The internal cavity 70 of the pin 52 is configured to retain a quantity of lubricating fluid for facilitating the pivoting of the bushing 62 and bogie arm 34 about the pin 52 without excessive friction. The cavity 70 is in fluid communication with the aperture 66 of the inboard facing end 60 which provides an inlet for the lubricating fluid. A resilient inboard stopper 76 is inserted into the cavity 70 through the aperture 66 of the inboard facing end 60 of the pin 52. A resilient outboard stopper 78 may be inserted at the outboard facing end 56 where the inner surface 68 extends through the pin 52 to an aperture 80 in the outboard facing end 56. Circumferential outer surfaces 82, 84 of the stoppers 76, 78, respectively, are engaged by the inner surface 68 of the pin 52 to form substantially water-tight seals and prevent the lubrication fluid from leaking out of the cavity 70. The radially extending orifices 74 provide passageways for the fluid from the cavity 70 to an outer reservoir 86 defined by the external surface 64 of the pin 52 and an inner surface 88 of the bushing 62 for the proper lubrication of bushing 62. If desired, filter screens (not shown) may be inserted within the orifices 74 and extend into the cavity 70 a distance sufficient to assure that contaminants, particles and debris within the cavity 70 will collect on the surface of the screens and will not clog the entrances to the orifices 74.

Figure 4:
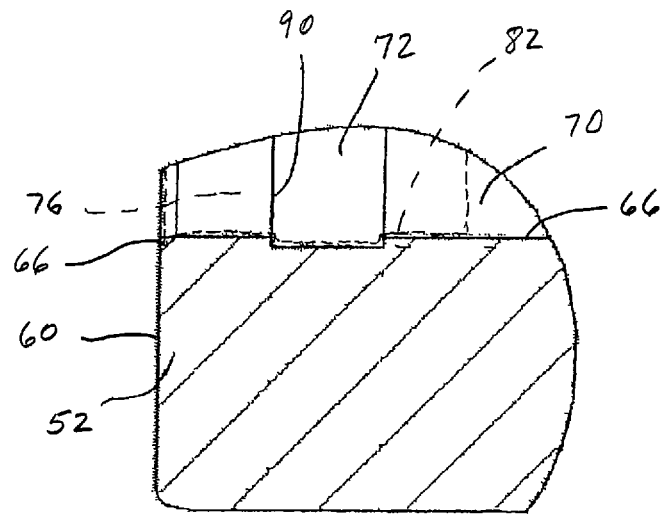
FIG. 4 is a detailed view of the inboard portion of the pin of the bogie assembly of FIG. 3.
Figure 5:
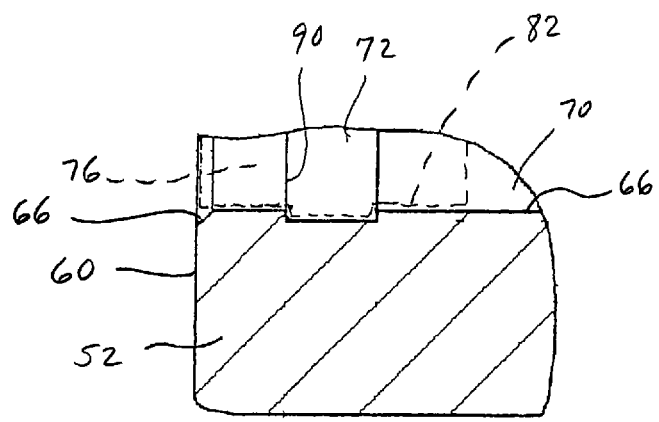
FIG. 5 is a detailed view of the inboard portion of the pin of the bogie assembly of FIG. 3 having a smaller inner diameter.

As will be apparent from FIG. 3, the outboard stopper 78 may be retained in engagement with the inner surface 68 of the pin 52 by the cover plate 48 to seal the cavity 70 on the outboard side. In many implementations, the arrangement of the bogie assembly 28 at the inboard side may make attachment of a similar cover plate impractical as a means of securing the inboard stopper 76. Consequently, in the present embodiment, the annular groove 72 serves to increase the retentive force between the inner surface 68 of the pin 52 and the circumferential outer surface 82 of the inboard stopper 76. As shown in further detail in FIG. 4, the annular groove 72 provides a recessed portion of the inner surface 68 of the pin 52 into which the inboard stopper 76 may expand once inserted through the aperture 66 of the inboard facing end 60 of the pin 52. The annular groove 72 may have an inboard side surface 90 that is approximately perpendicular to a longitudinal axis 92 (FIG. 3) of the pin 52 so that a greater force may be required in the inboard direction to force the inboard stopper 76 over the inboard side surface 90 to open the inboard facing end 60 of the cavity 70. FIG. 5 illustrates an example of the pin 52 having a smaller outer diameter and inner diameter that may be implemented in smaller track-driven equipment. In such embodiments, the corresponding dimensions may be compressed such that the annular groove 72 is positioned closer to the inboard facing end 60 of the pin 52 and has a narrower width, while still providing the inboard side surface 90 that is resistant to movement of the inboard stopper 76 in the inboard direction.

Figure 6:
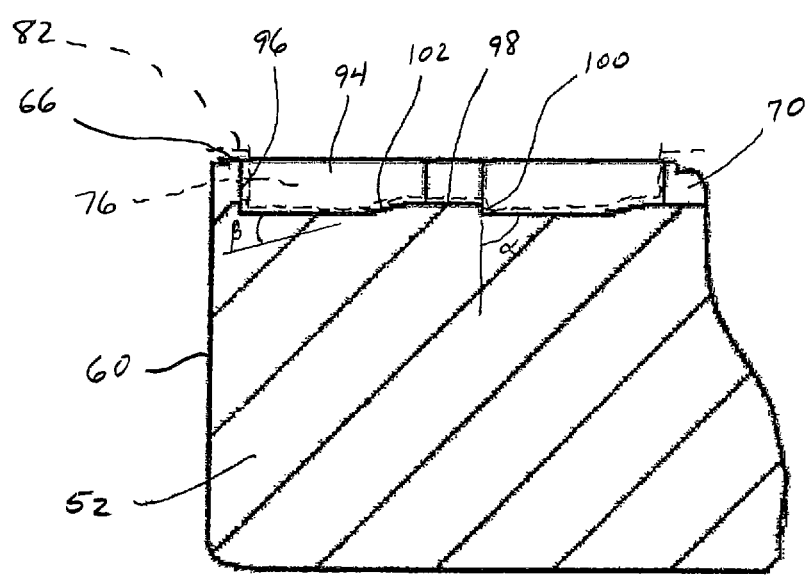
FIG. 6 is a detailed view of the inboard portion of an alternative embodiment of the pin of the bogie assembly of FIG. 3 having a protrusion within the annular groove.

FIG. 6 illustrates an alternative embodiment of an annular groove 94 providing additional surfaces for increasing the retention of the inboard stopper 76. The annular groove 94 may have a similar inboard side surface 96 to that discussed above for the annular groove 72. In addition, the annular groove 94 may have a positively oriented face including an annular protrusion 98 extending radially inwardly from the inner surface 68 of the pin 52. The annular grooves 72, 94 will have an inner diameter that is greater than the inner diameter of the inner surface 68, and the protrusion 98 may have an inner diameter that is less than the inner diameter of the annular groove 94 but is greater than the inner diameter of the inner surface 68. However, in some embodiments, the protrusion 98 may have an inner diameter that is equal to the inner diameter of the inner surface 68 such that the protrusion 98 may help define multiple annular grooves in the inner surface 68. The protrusion 98 may have an outboard side surface 100 similar to the inboard side surface 96 of the groove 94 that is approximately perpendicular to the longitudinal axis 92 of the pin 52. Alternatively, the outboard side surface 100 may extend at an angle α with respect the longitudinal axis 92 of the pin 52 ranging from approximately 90° to approximately 45° and sloping toward the outboard facing end 56 of the pin 52. An inboard side surface 102 of the protrusion 98 facing the inboard facing end 60 of the pin 52 may be perpendicular to the longitudinal axis 92 of the pin 52, or may extend at an angle β less than 90° from the longitudinal axis 92, such as within the range from less than to 90° down to approximately 45°, and sloping toward the inboard facing end 60 of the pin 52 to facilitate insertion of the inboard stopper 76 past the protrusion 98.

Returning to FIG. 3, the assembly of the bogie assembly 28 may begin with the assembly of the cartridge pin assembly 40. The bushing 62, which has a larger inner diameter than the outer diameter of the pin 52 to facilitate assembly and rotation about the pin 52, may be slid onto the external surface 64 of the pin 52 and positioned proximate the center of the pin 52. With the bushing 62 in position, the outboard collar 54 and inboard collar 58 may be press fit onto the corresponding outboard and inboard ends 56, 60 of the pin 52. If necessary, washers or other sealing devices may be provided between the collars 54, 58 and the bushing 62 to prevent leakage of the lubricating fluid around the edges of the bushing 62. The outer diameter of the pin 52 and the inner diameters of the openings through the collars 54, 58 may be dimensioned such that the components fit tightly together. If necessary, tack welds may be applied to ensure that the collars 54, 58 and pin 52 remain assembled. After the collars 54, 58 and bushing 62 are assembled on the pin 52, one of the stoppers 76, 78 may be inserted through the corresponding aperture 66, 80 of the pin 52, an appropriate amount of the lubricating fluid may be poured or injected into the cavity 70, and the other of the stoppers 76, 78 may be inserted through the opposite aperture 66, 80.

Once the cartridge pin assembly 40 is assembled, the bogie arm 34 may be pivotally attached to the bogie frame 32. The bogie arm 34 is positioned between the frame walls 36, 38, with openings through the bogie arm 34 and frame walls 36, 38 being axially aligned. So that the cartridge pin assembly may be fully inserted through the openings of the bogie frame 32 and frame walls 36, 38, the outer diameter of the inboard collar 58 may be smaller than the outer diameter than the bushing 62, and the outer diameter of the outboard collar 54 may be larger than the outer diameter of the bushing 62. Similarly, the inner diameter of the opening in the inboard frame wall 38 may be smaller than the inner diameter of the opening through the bogie arm 34, and the inner diameter of opening through the outboard frame wall 36 may be larger than the inner diameter of the opening through the bogie arm 34. Dimensioned in this way, the inboard collar 58 is inserted through the opening in the outboard frame wall 36 in the direction of the bogie arm 34 and the inboard frame wall 38. The cartridge pin assembly 40 is inserted in the inboard direction until the first of the mating pairs of elements engage at the edges, from which point the cartridge pin assembly 40 is press fit into the bogie arm 34 and frame walls 36, 38. At the inboard side of the bogie frame 32, shoulder or shoulders 104 may be provided that extend radially inwardly over the opening through the inboard frame wall 38 to engage the inboard collar 58 to properly aligned the cartridge pin assembly 40 within the bogie frame 32. After the cartridge pin assembly 40 is fully inserted, the cover plate 48 may be attached to the outboard frame wall 36 with fasteners 50 to retain the cartridge pin assembly 40 in place.

As discussed above, a pin in accordance with the present disclosure may be implemented in other mechanisms having a central hollow shaft containing a lubricating fluid and an outer bushing or other rotating component, with orifices of the shaft providing the lubricating fluid to the area between the outer surface of the shaft and the inner surface of the rotating component. For example, FIG. 7 illustrates an example of a track roller 110 having a shaft 112 in accordance with the present disclosure. The shaft 112 is mounted between a pair of frame members 114, 116, and has an inner surface defining a cavity 118 in which a quantity of a lubricating fluid may be disposed. Radial orifices 120 may provide the fluid from the cavity 118 to the outer surface of the shaft 112 and inner surface of a bushing or other component 122 rotatably disposed on the shaft 112 to facilitate smooth rotation of the component 122. Proximate an open end 124 of the cavity 118, the inner surface may define an annular groove 126, that may be similar to the grooves 72, 94 described above, extending around the circumference of the inner surface. In a similar manner, an elastomeric or resilient stopper 128 may be inserted into the open end and engaged by the inner surface of the shaft 112 to form a substantially watertight seal. The stopper 128 expands into the groove 126 so that a greater force may be required to force the stopper 128 to dislodge from the open end 124 of the shaft 112.

INDUSTRIAL APPLICABILITY

In general, the foregoing invention finds utility in various industrial applications, such as track-type tractors or bulldozers. In these applications, internal pressure within the cavity of the pin increase during operation of the equipment, and it is common for debris to impact the undercarriage in the area of the inboard collar and inboard stopper. These conditions tend to dislodge the inboard stopper where no additional external protection is available. Testing of pins having annular grooves has shown significant improvement over pins having smooth inner surfaces. In one such test, pins having inner diameters of 39±0.25 millimeters (1.53±0.01 inches) were compared to pins according to the present disclosure having inner diameters of 39±0.25 millimeters (1.53±0.01 inches) and annular grooves having inner diameters of 39.75±0.50 millimeters (1.56±0.02 inches). For both sets of pins, frustoconical stoppers having small outer diameters of 38.75±0.25 millimeters (1.53±0.01 inches) and large outer diameters of 44.20±0.50 millimeters (1.74±0.02 inches) were inserted through the apertures of the inboard facing ends of the pins. After insertion, pressure was applied within the cavities of the pins to create force tending to push the stoppers out of the pins. The pressure required to move each stopper measure to determine the pressure resistance of the pins. For the pins without grooves, the pressure required to move the stopper ranged from 40 psi to 75 psi, with the average pressure equal to 57.4 psi. For the pins with annular grooves, the pressure required to move the stopper ranged from 90 psi to 130 psi, with the average pressure equal to 103.0 psi. This testing shows an approximately 80% improvement in the pressure resistance with the pins having annular grooves proximate the inboard ends.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A pin for use in a track roller or bogie assembly, the pin comprising:
    an outboard facing end;
    an inboard facing end, the inboard facing end having an aperture;
    a cylindrically-shaped external surface extending from the outboard facing end to the inboard facing end; and
    an inner surface extending inwardly from the aperture of the inboard facing end toward the outboard facing end and defining a cavity within the pin, the inner surface including a groove disposed proximate the inboard facing end, the groove having an inboard side surface that is approximately perpendicular to a longitudinal axis of the pin.

2. The pin of claim 1, wherein the inner surface has a cylindrical shape having a uniform diameter, and the groove is an annular groove extending around the entire circumference of the inner surface.

3. The pin of claim 1, wherein the groove includes a positively oriented face.

4. The pin of claim 3, wherein the positively oriented face comprises a protrusion extending radially within the groove and having an outboard side surface facing the outboard facing end and extending perpendicular to the longitudinal axis of the pin.

5. The pin of claim 3, wherein the positively oriented face comprises a protrusion extending radially within the groove and having an outboard side surface facing the outboard facing end and extending at an angle ranging from 90° to 45° from the longitudinal axis of the pin and sloping toward the outboard facing end.

6. The pin of claim 3, wherein the positively oriented face comprises a protrusion extending radially inwardly within the groove and having an inboard side surface facing the inboard facing end and extending at an angle ranging from 90° to 45° from the longitudinal axis of the pin and sloping toward the inboard facing end.

7. The pin of claim 1, comprising at least one orifice extending from the inner surface to the external surface, wherein the orifice places the cavity in fluid communication with the exterior of the pin.

8. A cartridge pin assembly for use in a track roller or bogie assembly, the cartridge pin assembly comprising:
a pin, comprising:
an outboard facing end,
an inboard facing end, the inboard facing end having an aperture,
a cylindrically-shaped external surface extending from the outboard facing end to the inboard facing end, and
an inner surface extending inwardly from the aperture of the inboard facing end toward the outboard facing end and defining a cavity within the pin, the inner surface including a groove disposed proximate the inboard facing end, the groove having an inboard side surface that is approximately perpendicular to a longitudinal axis of the pin; and
an inboard stopper inserted into the inner surface through the aperture of the inboard facing end and engaging the inner surface to form a substantially water-tight seal at the inboard facing end of the cavity, wherein a portion of the inboard stopper is disposed within the groove.

9. The cartridge pin assembly of claim 8, comprising:
an outboard collar having an axial aperture, wherein the end of the pin proximate the outboard facing end is inserted into the aperture of the outboard collar and connected thereto;
an inboard collar having an axial aperture, wherein the end of the pin proximate the inboard facing end is inserted into the aperture of the inboard collar and connected thereto; and
a hollow cylindrical bushing disposed about the external surface of the pin between the outboard and inboard collars.

10. The cartridge pin assembly of claim 9, wherein the pin comprises at least one orifice extending from the inner surface to the external surface, wherein the orifice places the cavity in fluid communication with the exterior of the pin, the cartridge pin assembly comprising a lubricating fluid disposed within the cavity of the pin, with the orifice being dimensioned to allow the lubricating fluid to flow from the cavity to an outer reservoir defined by the external surface of the pin and an inner surface of the bushing.

11. A bogie assembly comprising:
a pin, comprising:
an outboard facing end,
an inboard facing end, the inboard facing end having an aperture,
a cylindrically-shaped external surface extending from the outboard facing end to the inboard facing end, and
an inner surface extending inwardly from the aperture of the inboard facing end toward the outboard facing end and defining a cavity within the pin, the inner surface including a groove disposed proximate the inboard facing end, the groove having an inboard side surface that is approximately perpendicular to a longitudinal axis of the pin;
an inboard stopper inserted into the inner surface through the aperture of the inboard facing end and engaging the inner surface to form a substantially water-tight seal at the inboard facing end of the cavity, wherein a portion of the inboard stopper is disposed within the groove;
an outboard collar having an axial aperture, wherein the end of the pin proximate the outboard facing end is inserted into the aperture of the outboard collar and connected thereto;
an inboard collar having an axial aperture, wherein the end of the pin proximate the inboard facing end is inserted into the aperture of the inboard collar and connected thereto;
a hollow cylindrical bushing disposed about the external surface of the pin between the outboard and inboard collars;
an outboard frame wall having an aperture, wherein the outboard collar is inserted into the aperture of the outboard frame wall and connected thereto;
an inboard frame wall having an aperture, wherein the inboard collar is inserted into the aperture of the inboard frame wall and connected thereto; and
a bogie arm having an opening there through, the bogie arm being disposed about and connected to the bushing between the outboard and inboard frame walls with the bushing and the bogie arm being rotatable about the pin.

12. The bogie assembly of claim 11, wherein the outboard facing end of the pin has an aperture and the inner surface of the pin extends to the aperture of the outboard facing end, the bogie assembly comprising:
an outboard stopper inserted into the inner surface through the aperture of the outboard facing end and engaging the inner surface to form a substantially water-tight seal at the outboard facing end of the cavity; and
a cover plate connected to the outboard frame wall and engaging the outboard stopper to retain the outboard stopper within the aperture of the outboard facing end.

* * * * *